(12) United States Patent
Wisecarver et al.

(10) Patent No.: US 6,819,509 B2
(45) Date of Patent: Nov. 16, 2004

(54) OPTICAL ISOLATOR MOUNTING APPARATUS

(75) Inventors: Martin Wisecarver, Fremont, CA (US); Charles Hu, Sunnyvale, CA (US)

(73) Assignee: Finisar Corporation, Sunnyvale, CA (US)

(*) Notice: Subject to any disclaimer, the term of this patent is extended or adjusted under 35 U.S.C. 154(b) by 55 days.

(21) Appl. No.: 10/224,814

(22) Filed: Aug. 21, 2002

(65) Prior Publication Data

US 2004/0036986 A1 Feb. 26, 2004

(51) Int. Cl.$^7$ ................................................ G02B 7/02
(52) U.S. Cl. ...................... 359/819; 359/820; 359/822; 347/244; 347/245
(58) Field of Search ............................... 359/819, 811, 359/813, 820, 822, 826, 288; 385/136, 52; 347/244, 245, 256, 258, 263

(56) References Cited

U.S. PATENT DOCUMENTS

| | | | |
|---|---|---|---|
| 5,073,047 A | 12/1991 | Suzuki et al. | 385/93 |
| 5,077,819 A | 12/1991 | Greil et al. | 385/79 |
| 5,506,424 A | 4/1996 | Wilcken | 257/99 |
| 5,703,992 A | * 12/1997 | Bergmann | 385/139 |
| 5,737,346 A | 4/1998 | Stenstrom | 372/21 |
| 5,841,923 A | 11/1998 | Kyoya | 385/93 |
| 6,011,577 A | * 1/2000 | Goodman et al. | 347/259 |
| 6,118,912 A | 9/2000 | Xu | 385/24 |
| 6,122,115 A | 9/2000 | Plummer et al. | 359/822 |
| 6,201,908 B1 | 3/2001 | Grann | 385/24 |
| 6,292,311 B1 | * 9/2001 | Bohn et al. | 359/819 |
| 6,348,985 B1 | 2/2002 | Jiang et al. | 359/127 |
| 6,473,553 B1 | * 10/2002 | Jerman et al. | 385/137 |
| 6,477,056 B1 | * 11/2002 | Edwards et al. | 361/752 |
| 6,485,192 B1 | 11/2002 | Plotts et al. | 385/75 |
| 6,487,355 B1 | 11/2002 | Flanders | 385/134 |
| 6,511,253 B1 | * 1/2003 | Grimes et al. | 403/327 |

* cited by examiner

*Primary Examiner*—Ricky Mack
*Assistant Examiner*—Brandi N Thomas
(74) *Attorney, Agent, or Firm*—Workman Nydegger

(57) ABSTRACT

Embodiments of the invention provide for an improved optical component mounting apparatus and method. In one embodiment, the invention provides an optical component mounting apparatus that provides for accurate mounting of an optical component without the use of epoxy or other affixing agents. The optical component mounting apparatus includes a body having a bore formed longitudinally therethrough between a first and second end. The body also includes an inner sidewall of the body disposed adjacent the first end that defines a first component holding region. The first component holding region is in an offset alignment with the bore, the inner wall is adapted to frictionally accept a first component therein and exert a biasing force thereon to maintain the first component in a desired optical alignment. In another embodiment, the body includes an outer sidewall disposed between the first and second ends, wherein the inner and outer sidewalls define a second component holding region therebetween. The inner and outer sidewalls are adapted to frictionally accept a second component therein and exert a biasing force thereon to maintain the second component in a desired alignment relative the bore.

10 Claims, 3 Drawing Sheets

OPTICAL ISOLATOR MOUNTING APPARATUS

BACKGROUND OF THE INVENTION

1. Field of the Invention

Embodiments of the invention generally relate to optical communication subsystems, and more particularly, to optical interconnection devices.

2. Description of the Related Art

The manufacturing processes involved in generating optical systems generally requires precise alignment of lenses, prisms, mirrors, isolators, and other optical components within various mounting apparatuses. Precise alignment is particularly important in laser-based optical systems, as misalignment may interfere with optical isolation, which may reduce or eliminate the optical gain needed for proper laser operation and may increase system noise. Additionally, with regard to polarization and filtration processes involving crystals, the crystals often require precise alignment in order to achieve minimum insertion loss and maximum polarization parameters. Although optical isolators often use magnets to align the photons for increased polarization efficiency with respect to the crystal lattice, if the magnets are not properly aligned relative the lattice, polarization may nonetheless still be negatively affected and the return loss decreased.

Therefore, in order to minimize component alignment problems, specialized optical mounting devices are frequently used to secure optical components therein. For example, a retainer ring, spring-type retainer, or other means for exerting a biasing/securing pressure generally operates to secure the optical component within the mounting device, thereby reducing the chance that the optical component will be moved out of alignment after the initial assembly process is complete. However, the biasing pressure in conventional mounting devices is generally applied in a single direction, i.e., the component is biased against a fixed member in a unitary direction in order to prevent translational movement of the component. However, these configurations may still be subject to small perturbations in directions other than the biasing pressure direction, such as, for example, in a rotational direction or a direction orthogonal to the biasing direction. For example, many optical mounts (especially prism mounts) make use of a spring retainer, wherein the spring retainer contacts the top of the optical component urging it down against a base plate. In this configuration, the optical component is prevented from being translated in the direction of the biasing force, however, rotational movement and/or slipping of the lens horizontally is not restricted. Conversely, many optical isolator mounts secure their optical components at their perimeter, thereby preventing rotation, however, these mounting configurations may still be susceptible to translational movement or slippage. Another common optical component mounting technique is to clamp the optical component in place with a rod that urges the optical component against one or more base plates, where the rod is attached to a post with locking screws, and the rod in turn is securely attached to the base plates. However, the use of screws can be problematic, as they may loosen in time, particularly when they are exposed to the temperature cycling that often accompanies optical systems. Furthermore, the rod configuration generally offers only a unitary direction biasing/securing force, and therefore, it is again susceptible to rotational and horizontal translations.

Another common approach to mounting optical components is to use epoxy-based mounts. In these configurations, the optical component is placed in a mount and an epoxy is applied to the perimeter of the component. Once the epoxy cures, the component is generally affixed in the mount and is not susceptible to movement. However, although the use of epoxies is generally suitable for room temperature applications, epoxy mounts have shown weakness in environments where the temperature fluctuates, as epoxies and optical materials generally have different temperature coefficients of expansion. Thus, the epoxy may expand or contract at a different rate than the surrounding mount or the optical component itself, which can displace the optical component and potentially break the mounting bond.

Therefore, in view of the disadvantages of conventional optical mounting devices and methods, there is a need for a simple, easily manufactured, efficient, and cost effective optical isolator mounting apparatus that overcomes the disadvantages of conventional optical mounting devices.

SUMMARY OF THE INVENTION

Embodiments of the invention generally provides an apparatus for holding optical components. In one embodiment, the invention provides an inner sidewall of the body disposed between a first and second end of the body defining a first component holding region. The first component holding region is in an offset alignment with the bore, the inner wall is adapted to frictionally accept a first component therein and exert a biasing force thereon to maintain the first component in a desired optical alignment. The apparatus further includes an outer sidewall of the body disposed between the first and second ends. The inner and outer sidewalls define a second component holding region therebetween, wherein the inner and outer sidewalls are adapted to frictionally accept a second component therein and exert a biasing force thereon to maintain the second component in a desired alignment relative the bore.

Embodiments of the invention further provide an optical component mounting apparatus including a body having a bore formed longitudinally therethrough. The body includes a first end that includes a component holding region disposed in an offset alignment with the bore and is configured to receive an optical component therein. The component holding region includes a receiving diameter sized less than the diameter of the optical component to be inserted, wherein once the optical component is inserted, the component holding region is allowed to deform to the optical component diameter, which operates to mechanically secure the optical component within the component holding region.

Embodiments of the invention further provide an optical interconnect including a body having a longitudinal bore therethrough, a first end of the body includes an interior sidewall portion of the body defining a first component holding region adapted to deform when a first component is inserted to mechanically secure the first component therein. The first end further includes an exterior wall, wherein the interior wall and the exterior wall form a second component holding region therebetween that deform to mechanically secure a second component therein. The optical component also includes a second end of the body that includes an optical interface, and an exterior mounting section adapted to receive and mechanically couple a mating optical interconnect output to the optical interface.

Embodiments of the invention further provide a method for mounting an optical component within an internal sidewall of an optical body. The method generally includes inserting the optical component into a cavity defined by the internal sidewall, crushing a plurality of fingers extending from the internal sidewall between the optical component and the internal sidewall, and generating a predetermined clamping force between the crushed fingers and optical component, the predetermined clamping force having a magnitude calculated to secure the optical component within the cavity.

BRIEF DESCRIPTION OF THE DRAWINGS

So that the manner in which the above recited features of the invention are attained can be understood in detail, a more particular description of the invention, briefly summarized above, may be had by reference to the embodiments thereof, which are illustrated in the appended drawings. It is to be noted, however, that the appended drawings illustrate only typical embodiments of this invention, and are therefore, not to be considered limiting of its scope, for the invention may admit to other equally effective embodiments.

DETAILED DESCRIPTION OF THE PREFERRED EMBODIMENT

Figure 1:
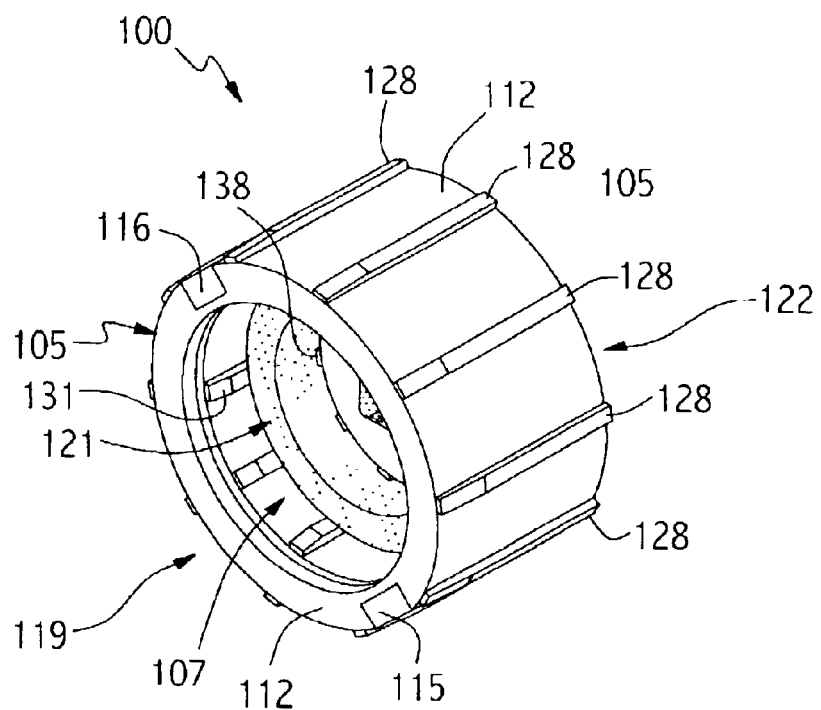
FIG. 1 is a perspective view of an exemplary optical isolator mounting apparatus of the invention.
Figure 2:
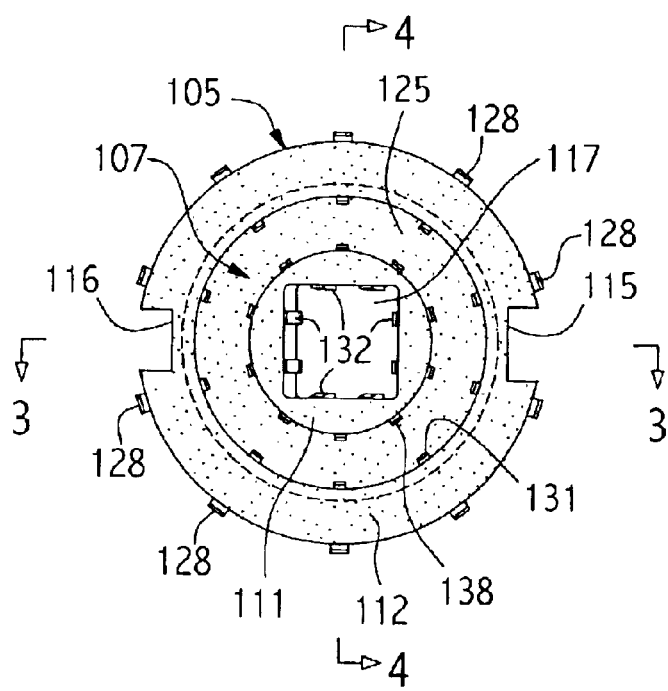
FIG. 2 is an end view of the exemplary optical isolator mounting apparatus of FIG. 1.
Figure 3:
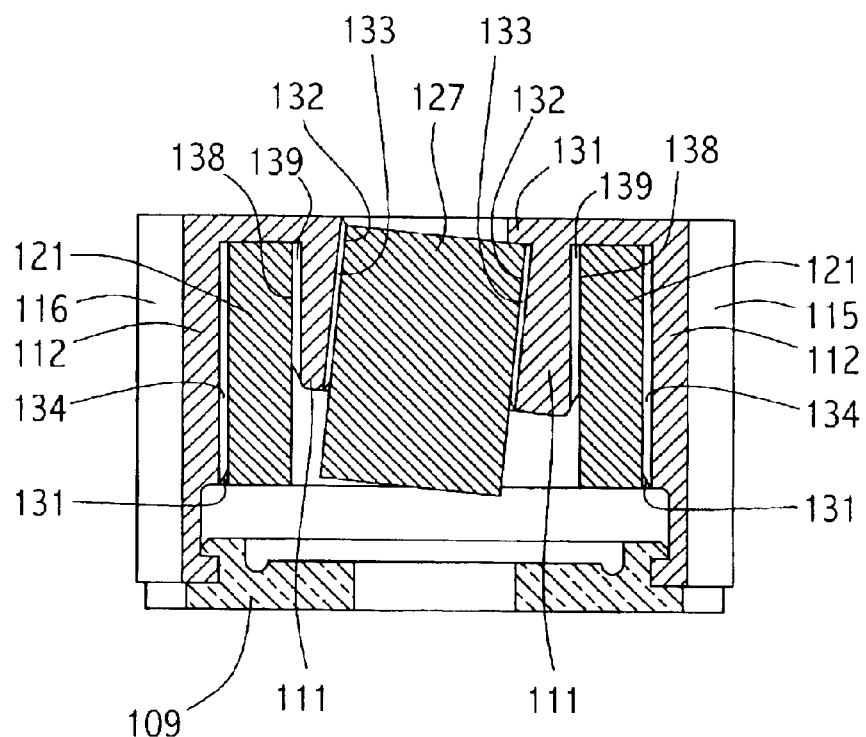
FIG. 3 illustrates a cross-sectional view of optical isolator mounting apparatus of FIG. 2.

Embodiments of the invention generally provide an optical component mounting apparatus adapted secure optical isolator components through temperature variations. FIGS. 1–4 illustrate a perspective view, end view, and sectional views, respectively, of an exemplary embodiment of an optical interconnect device 100. As illustrated in FIGS. 1–3, the optical interconnect device 100 generally includes a body 105 having a longitudinal bore 107 formed therethrough. The body 105 may be formed of high tensile elastic and/or semi-elastic metal materials, such as ALTEM, stainless steel, and other materials adapted to provide stable and/or rigid support for optical components. The body 105 generally includes a plurality of external snap members 128 adapted to interface with a mating connector (not shown). The external snap members 128 may taper from a larger extension relative a first end 122 to a second end 119 in order to allow for ease of assembly with the mating connector. In one aspect of the invention, the external snap members 128 may include an interlocking connection, such as a snap connection, or other mechanical connection structures. Alternatively, the external snap members 128 may be an interference fit type connection adapted to frictionally couple the optical interconnect device 100 to the mating connector. The body 105 further includes a second end 122 adapted to receive optical signals therethrough. In one aspect, the body 105 may include a first and second key slots 115, 116. The first key slot 115 being sized either larger or smaller than the second key slot 145, to provide a radial alignment key when assembling the optical interconnect device into a mating component.

Figure 4:
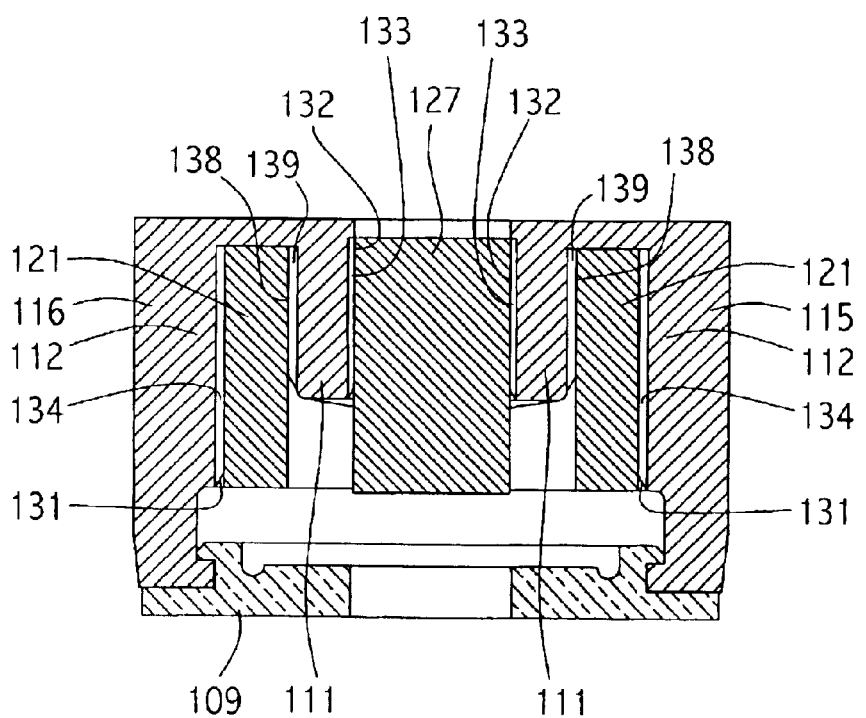
FIG. 4 illustrates a cross-sectional view of optical isolator mounting apparatus of FIG. 2.

As illustrated in FIGS. 3 and 4, the body 105 may further include an inner wall 111 adjacent the first end 122 coupled to the bore 107. In one aspect, while the inner wall 111 defines a generally trapezoidal cavity 117 adapted to receive and support a trapezoidal optical component 127, other shapes, i.e., round, square, triangular, etc., are contemplated within the scope of the invention. The trapezoidal cavity 117 may be offset from bore 107 to provide the optical component 127 an optimum polarization position relative to bore 107. The body 105 may also include a clamp edge 131 adjacent the first end 122, wherein the clamp edge 131 may extend horizontally from body 105 to define the inside diameter of bore 107 at the first end 122, and may be adapted to impede the optical component 127 from longitudinally moving backwards out of the trapezoidal cavity 117 once inserted and secured therein. The body 105 may also include an outer wall 112, wherein the inner wall 111 and outer wall 112 cooperatively define an annular cavity 125 configured to hold an annular component, such as a magnet 121, therein in axial alignment with the longitudinal bore 107. In one configuration, the annular magnet 121 is formed from ferrous materials such as iron and adapted to rotate photons passing through the optical component 127 to facilitate polarization.

Figure 5:
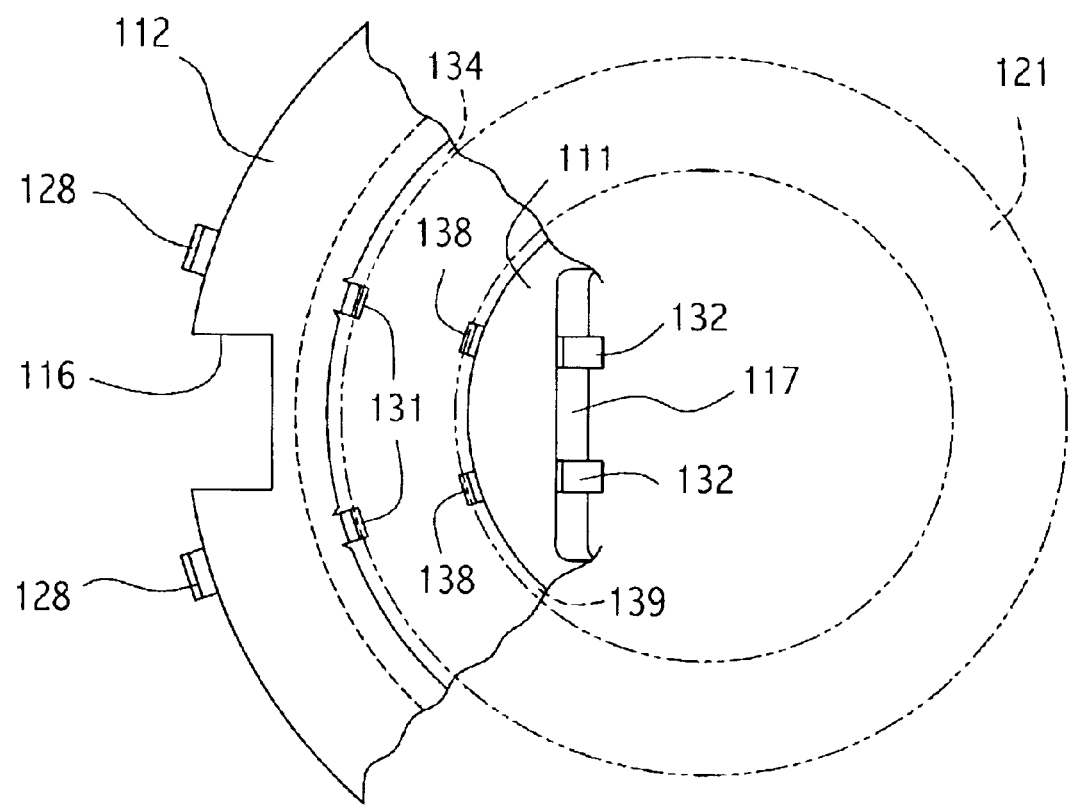
FIG. 5 illustrates a partial cross-sectional view of optical isolator mounting apparatus of FIG. 2.

As illustrated in FIGS. 4 and 5, to secure the optical component 127 within the optical component cavity 117, the inside surfaces of the inner wall 111 include a first set of fingers 132. Each finger of the first set of fingers 132 is adapted to crush within a gap 133 formed between the inner wall 111 and the outer surface of the optical component 127. Further, the composition and physical structure of the fingers is generally configured to crush at specific pressure points. Therefore, the composition and structure of the respective fingers may be varied, which will directly vary the crush point of the fingers, and as a result thereof, the clamping force applied to the component secured by the fingers is also varied. When crushed, the first set of fingers 132 provide a frictional force between the inside walls of the inner wall 111 and the outside surface of the optical component 127. Therefore, the inner wall 111, the clamp edge 131, and the first set of fingers 132 cooperatively support the optical component 127 in a desired position without the use of affixing agents such as epoxy.

To secure the magnet 121 within the optical annular cavity 125, the inside surfaces of the outer wall 112 may include a second set of fingers 131. Each finger of the second set of fingers 131 is adapted to crush within an outer gap 134 formed between the outer wall 111 and the outer surface of the magnet 121. To further secure the magnet 121, a third set of fingers 138 are disposed on the outer surface of the inner wall 111. Each finger of the third set of fingers 138 is adapted to crush within a gap 139 formed between the outer surface of the inner wall 111 and an inner surface of the magnet 121. When crushed, the second set of fingers 131 provide a frictional force between the inside walls of the inner wall 111 and the inner surface of the magnet 121. Therefore, the inner wall 111, the outer wall 112, the second and third set of fingers 131, 138 cooperatively support the magnet 121 in a desired position without the use of affixing agents such as epoxy.

During an optical component insertion step, the first set of fingers 132 have a diameter larger than the outside diameter of the optical component 127 and deform to accept the outside diameter of the optical component 127. For example, during installation of an optical isolator having an outside diameter of three microns less than the inside diameter of the inner wall 111 defined by the first set of fingers 132, the first set of fingers 132 crush down about three microns to allow the optical component 127 to be inserted into the trapezoidal cavity 117 and held securely therein. This three micron crush is generally calculated to supply an optimal securing force to the optical component being secured in the insertion step.

Alternatively, if a greater securing force is desired, then the physical structure of the fingers or the composition thereof may be varied to provide the desired securing force.

During a magnet insertion step, the second and third set of fingers 133, 138, which are configured similarly to the first set of fingers 132, deform to accept the outside diameter and inside diameter of the magnet 121. For example, during installation of magnet 121 having an outside diameter of five microns less than the inside diameter of the outer wall 112 defined by the second set of fingers 131, and five microns greater than the outside diameter of the inner wall 111 defined by the third set of fingers 138, the second and third set of fingers 131, 138 crush down about five microns to allow the magnet 121 to be inserted into the annular cavity 125 and held securely therein.

As illustrated in FIGS. 3 and 4, the optical component mounting device 100 also generally includes a lid member 109 detachably disposed on the insertion aperture 119, wherein the lid member 109 may be formed from optically clear materials such as glass to prevent contamination from entering the trapezoidal cavity 117. Alternatively, lid member 109 may be a generally solid disk shaped member having a bore formed in a central portion thereof, wherein the bore is positioned in axial alignment with the longitudinal bore 107 to allow an optical signal to travel therethrough. Regardless of the specific configuration, lid 109 is generally configured to be attached to the first end 119 of the optical interconnect device 100. The attachment process may include a press operation, a snap in operation, and epoxy operation, or other operation suitable for attaching a lid to an optical component 127. Thus, in one configuration, the lid 109 in cooperation with the first, second, and third set of fingers 132, 131, 138, cooperatively support the magnet 121 and the optical component 127 in a desired position without the use of affixing agents such as epoxy.

While the foregoing is directed to embodiments of the invention, other and further embodiments of the invention may be devised without departing from the basic scope thereof, and the scope thereof is determined by the claims that follow.

What is claimed is:

1. An optical interconnect, comprising:
   a body having a longitudinal bore therethrough;
   a first end of the body including an interior sidewall position of the body defining a component holding region adapted to deform when a first component is inserted to mechanically secure the first component therein, the first end further includes an exterior waif, wherein the interior wall and the exterior wall form a second component holding region therebetween that deforms to mechanically secure a second component therein;
   a second end of the body that includes an optical interface; and
   an exterior mounting section adapted to receive and mechanically couple a mating optical interconnect output to the optical interface.

2. The optical interconnect of claim 1, wherein the body material is selected from ALTEM, stainless steel, and combinations thereof.

3. The optical interconnect of claim 1, wherein the component holding region comprises an inside diameter smaller, than the optical component outside diameter.

4. The optical interconnect of claim 1, wherein the optical interface includes one or more snap members thereon.

5. The optical interconnect of claim 1, wherein a support edge of the body defines an inside diameter of the bore adjacent the first end.

6. A method for mounting an optical component within an internal sidewall of an optical body, comprising
   inserting the optical component into a cavity defined by the internal sidewall;
   crushing a plurality of fingers extending from the internal sidewall between the optical component and the internal sidewall; and
   generating a predetermined clamping force between the crushed fingers and optical component, the predetermined clamping force having a magnitude calculated to secure the optical component within the cavity.

7. The apparatus of claim 6, wherein crushing comprises deforming at least some of the plurality of fingers such that they are squeezed between the optical component and the sidewall.

8. The apparatus of claim 6, further comprising providing a second sidewall defining an annular cavity configured to receive an annular component therein.

9. The apparatus of claim 8, further comprising inserting the annular component within the annular cavity and crushing a second plurality of fingers extending from the second sidewall toward the annular component.

10. The apparatus of claim 9, wherein the crushing the second plurality of fingers comprises generating a variable clamping force between the second plurality of fingers and the annular component of a magnitude determined to secure the annular component within the annular cavity.

* * * * *

UNITED STATES PATENT AND TRADEMARK OFFICE
CERTIFICATE OF CORRECTION

PATENT NO. : 6,819,509 B2  Page 1 of 1
APPLICATION NO. : 10/224814
DATED : November 16, 2004
INVENTOR(S) : Wisecarver et al.

It is certified that error appears in the above-identified patent and that said Letters Patent is hereby corrected as shown below:

Column 2,
Line 20, after "the invention generally" change "provides" to --provide--
Line 50, after "end of the body" change "includes" to --include--

Column 3,
Line 13, before "by reference" change "had" to --made--
Line 34, after "adapted" insert --to--

Column 5,
Line 46, before "of the body" change "position" to --portion--
Line 49, after "an exterior" change "waif," to --wall,--

Column 6,
Line 14, after "inside diameter smaller" remove [,]

Signed and Sealed this

Fourteenth Day of December, 2010

David J. Kappos
*Director of the United States Patent and Trademark Office*